(12) United States Patent
Farmer

(10) Patent No.: US 7,139,225 B2
(45) Date of Patent: Nov. 21, 2006

(54) VIRTUAL REAL-TIME CLOCK BASED ON TIME INFORMATION FROM MULTIPLE COMMUNICATION SYSTEMS

(75) Inventor: Dominic Farmer, Los Gatos, CA (US)

(73) Assignee: Qualcomm, Incorporated, San Diego, CA (US)

( * ) Notice: Subject to any disclaimer, the term of this patent is extended or adjusted under 35 U.S.C. 154(b) by 395 days.

(21) Appl. No.: 10/401,816

(22) Filed: Mar. 27, 2003

(65) Prior Publication Data

US 2004/0190378 A1 Sep. 30, 2004

(51) Int. Cl.
*G04C 11/02* (2006.01)
*G04C 13/00* (2006.01)
*H04Q 7/20* (2006.01)
*H04B 7/01* (2006.01)

(52) U.S. Cl. .................. 368/46; 368/47; 455/456.1; 455/502; 702/89

(58) Field of Classification Search ............... 368/10, 368/46, 47, 52, 55; 375/354–356; 455/502, 455/503; 702/85, 89, 177, 178, 187
See application file for complete search history.

(56) References Cited

U.S. PATENT DOCUMENTS

| | | | | |
|---|---|---|---|---|
| 5,416,808 A | * | 5/1995 | Witsaman et al. | 375/356 |
| 5,444,672 A | * | 8/1995 | Kushita | 368/47 |
| 5,510,797 A | * | 4/1996 | Abraham et al. | 342/352 |
| 5,872,774 A | | 2/1999 | Wheatley, III et al. | 370/335 |
| 5,945,944 A | * | 8/1999 | Krasner | 342/357.06 |
| 6,078,873 A | * | 6/2000 | Shutty et al. | 702/89 |
| 6,150,980 A | * | 11/2000 | Krasner | 342/357.1 |
| 6,185,429 B1 | * | 2/2001 | Gehrke et al. | 455/502 |
| 6,236,623 B1 | * | 5/2001 | Read et al. | 368/46 |
| 6,377,517 B1 | * | 4/2002 | Tursich | 368/47 |
| 6,433,734 B1 | * | 8/2002 | Krasner | 342/357.09 |
| 6,483,825 B1 | * | 11/2002 | Seta | 370/335 |
| 6,556,512 B1 | * | 4/2003 | Winkler | 368/47 |
| 6,603,978 B1 | * | 8/2003 | Carlsson et al. | 455/502 |
| 6,633,825 B1 | * | 10/2003 | Burns et al. | 702/61 |
| 6,678,510 B1 | * | 1/2004 | Syrjarinne et al. | 455/255 |
| 6,758,202 B1 | * | 7/2004 | Russell et al. | 123/685 |
| 6,865,380 B1 | * | 3/2005 | Syrjarinne | 455/255 |
| 2002/0173322 A1 | | 11/2002 | Turetzky et al. | 455/502 |

FOREIGN PATENT DOCUMENTS

| | | |
|---|---|---|
| WO | 0010028 | 2/2000 |
| WO | 0173467 | 10/2001 |

* cited by examiner

*Primary Examiner*—Vit W. Miska
(74) *Attorney, Agent, or Firm*—Philip Wadsworth; Bruce W. Greenhaus; Andrea L. Mays

(57) ABSTRACT

Method and apparatus to implement a "virtual" real-time clock at a terminal based on time information from multiple communication systems. At least one system (e.g., GPS) provides "absolute" time information for the virtual real-time clock, and at least one other system (e.g., a cellular system) provides "relative" time information. The virtual real-time clock is "time-stamped" with absolute time as it becomes available from the first system. Relative time (which may be received from multiple asynchronous transmitters) is mapped to the timeline of the virtual real-time clock as it is received from the second system. Absolute time at any arbitrary time instant on the timeline may then be estimated based on the absolute time from the first system and the relative time from the second system. Absolute times from the first system for two or more time instants may also be used to calibrate the relative time from the second system.

38 Claims, 9 Drawing Sheets

VIRTUAL REAL-TIME CLOCK BASED ON TIME INFORMATION FROM MULTIPLE COMMUNICATION SYSTEMS

BACKGROUND

1. Field

The present invention relates generally to communication, and more specifically to a method and apparatus for implementing a virtual real-time clock based on time information from multiple communication systems.

2. Background

It is often desirable, and sometimes necessary, for a wireless terminal to know accurate time. One specific application that requires accurate time is position determination based on the well-known Global Positioning System (GPS), which is a constellation of 24 well-spaced satellites that orbit the earth. Each GPS satellite transmits a signal encoded with information that allows GPS receivers on earth to measure the time of arrival of the received signal relative to an arbitrary point in time. This relative time-of-arrival measurement may then be converted to a "pseudo-range". The position of a GPS receiver may be accurately estimated based on pseudo-range measurements for a sufficient number of satellites and their locations.

The time-of-arrival of a signal from a GPS satellite may be determined by processing the GPS signal itself to obtain the necessary time information. For GPS, the complete time information may be partitioned into three different time components: bit of week (BOW), epoch (in bit), and sub-code frame (all of which are described in detail below). Each time component covers a different time range and has a different time resolution. Each time component may be obtained from the GPS signal based on different signal processing by the receiver. The processing to obtain these time components is typically performed in sequential order, in increasing coarse time resolution, such that sub-code frame (fine) timing is obtained first, epoch (in bit) timing is obtained next, and BOW (coarse) time information is obtained last. The processing time to obtain a given time component from the GPS signal is thus cumulative (i.e., equal to the processing time for that time component plus the processing time for all finer time components). If the GPS receiver has a priori knowledge of any of these time components, then it can skip the corresponding processing to obtain the component. This would then reduce the amount of time needed to obtain the pseudo-range measurement and, ultimately, a position fix for the terminal.

A terminal can obtain GPS time as one of the results of a position fix. The GPS time can be viewed as "true" or absolute time, and includes all three time components described above. This GPS time may be used to "time stamp" the internal timing of the terminal, so that it knows true or absolute time at a specific time instant. Between position fixes, the terminal may be operated in an idle mode whereby as much circuitry as possible is powered down to conserve battery power. While in the idle mode, the terminal typically maintains a counter that is operated based on an internal clock. The counter is effectively a timer used to provide time information for the terminal while it is idle and not receiving signals from any transmitters.

The terminal may be commanded to perform a new position fix at an arbitrary time instant. The counter may then be used as a real-time clock to estimate the amount of time that has elapsed, as measured by the terminal's internal clock, since the time instant for which the last GPS time was obtained. The absolute time at this arbitrary time instant may be estimated by adding the elapsed time estimate to the last GPS time. The accuracy of this absolute time estimate is dependent on the accuracy of the elapsed time estimate. If the elapsed time can be estimated with a relatively high degree of accuracy, then the absolute time estimate is reasonably accurate. In this case, it may not be necessary to recover BOW and epoch in bit timing for the new position fix. Consequently, the new position fix may be obtained in a much shorter amount of time, which is highly desirable.

Unfortunately, the terminal's internal clock may not be sufficiently accurate. For example, the internal clock used to implement the terminal's real-time clock may have an error as large as 100 parts per million (ppm). The elapsed time estimate would then be in error by the same ppm amount, with the magnitude of the error being larger for longer elapsed time. For example, a 100 ppm error on an elapse time of 50 seconds is 5 msec, and the same 100 ppm error on an elapsed time of 500 seconds is 50 msec. A large error in the elapsed time estimate may then necessitate the need to recover epoch in bit and (possibly) BOW timing for a new position fix, which is highly undesirable.

There is therefore a need in the art for a method and apparatus to implement a real-time clock having higher accuracy and which may be used for various applications such as position determination.

SUMMARY

A method and apparatus is provided herein to implement a "virtual" real-time clock at a terminal based on time information from multiple communication systems. At least one system (e.g., GPS) provides "absolute" time information for the virtual real-time clock, and at least one other system (e.g., a cellular system) provides "relative" time information. The virtual real-time clock may be "time-stamped" with absolute time as it becomes available from the first system. Relative time (which may be received from multiple asynchronous transmitters in the second system) may be mapped to the timeline of the virtual real-time clock as it is received from the second system. Absolute time at any arbitrary time instant on the timeline may then be estimated based on the absolute time from the first system and the relative time from the second system. Absolute times from the first system for two or more time instants may also be used to calibrate the relative time from the second system.

A specific embodiment of a method described herein can provide an estimate of absolute time based on time information from a number of communication systems. Initially, absolute time is obtained from a first system (e.g., GPS) for a first time instant. A first signaling message (e.g., a synchronization burst) is received from a first transmitter in a second system (e.g., a GSM or W-CDMA system) at a second time instant. A first time offset between the first and second time instants is then determined. A second signaling message may also be received from a second transmitter in the second system at a third time instant (e.g., in handoff situation). The first and second transmitters may be asynchronous with respect to each other, in which case a second time offset between the first and third time instants may be determined. A third signaling message may thereafter be received from either the first or second transmitter at a fourth time instant. An estimate of absolute time at a designated time instant may then be determined based on (1) the absolute time for the first time instant, (2) the first [or second] time offset, (3) an elapsed time between the second [or third] time instant and the fourth time instant, and (4) the time difference between the fourth time instant and the designated time instant (the term within the bracket is applicable if the relative time of the second transmitter is used to estimate the absolute time at the designated time instant).

Various aspects and embodiments of the method and apparatus are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
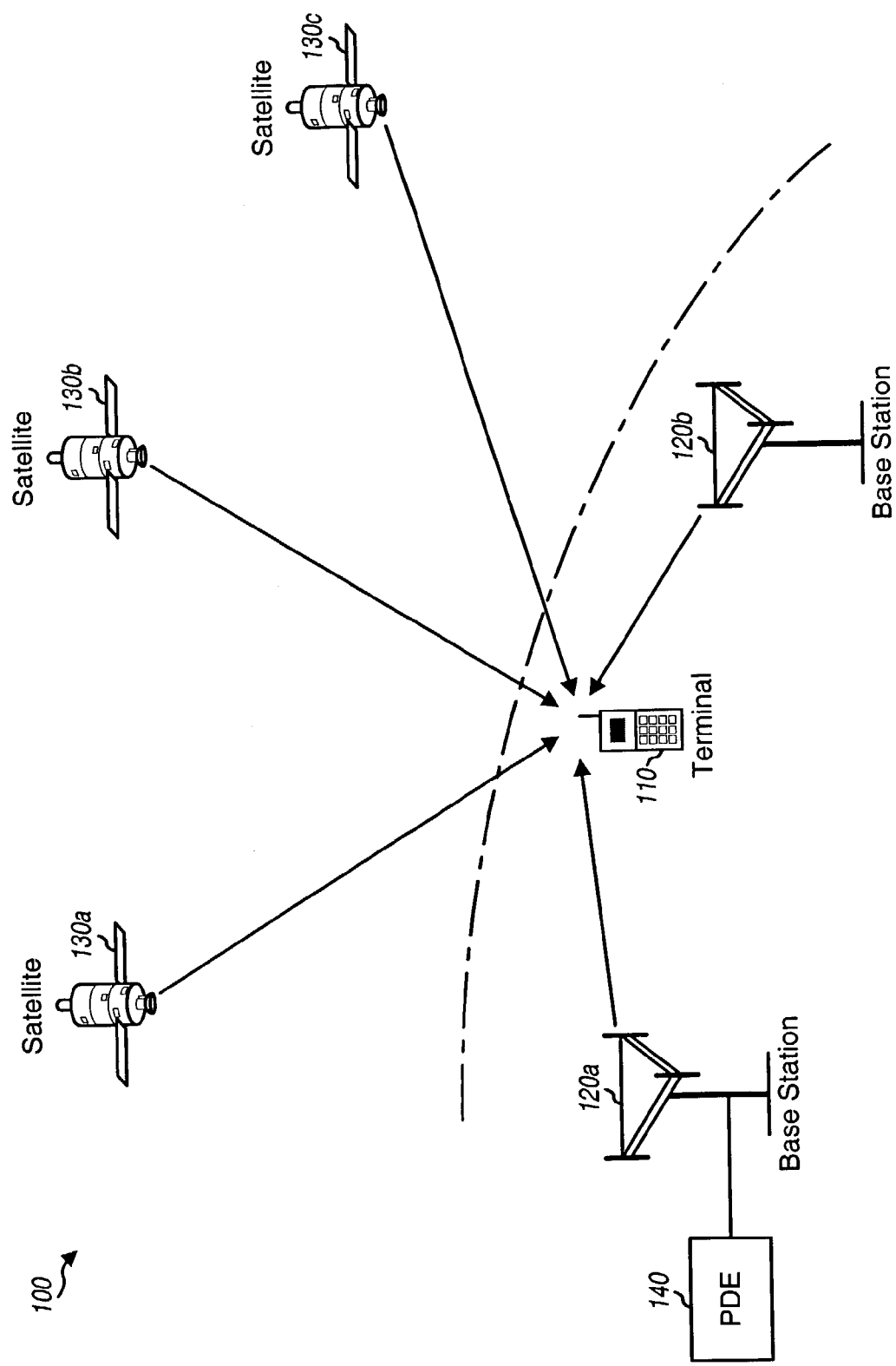
FIG. 1 is diagram showing a wireless terminal capable of receiving signals from multiple communication systems.

FIG. 1 is diagram showing a wireless terminal 110 capable of receiving signals from multiple communication systems. One such communication system is the well-known Global Positioning System (GPS). Another such communication system is a wireless (e.g., cellular) communication system, which may be a Code Division Multiple Access (CDMA), Time Division Multiple Access (TDMA), Frequency Division Multiple Access (FDMA), or some other multiple-access communication system. The CDMA system may implement one or more standards such as IS-95, IS-2000, W-CDMA, and so on. The TDMA system may implement one or more standards such as GSM, GPRS, and so on. These various standards are known in the art and incorporated herein by reference. In general, terminal 110 may receive signals from any number of communication systems that may be of any type (e.g., a Bluetooth, WI-FI, or any other system capable of providing time information). In a specific embodiment that is described in detail below, terminal 110 is capable of receiving signals from the GPS and GSM system.

Terminal 110 may receive signals from a number of GPS satellites 130, and may process these GPS signals to derive an estimate of its current position. The terminal may obtain GPS time as one of the results of a position fix (or may be operated to process the GPS signals to obtain only GPS time). This GPS time is an accurate indication of actual time, since the clocks maintained by the GPS satellites are very accurate and are further adjusted as necessary to track an extremely accurate atomic clock on earth. The GPS time may thus be viewed as "true" or absolute time. The terminal can calibrate its own timing whenever it is provided with GPS time. However, since the terminal may perform position fixes at sporadic time instants (e.g., whenever directed by the user and/or the cellular system), GPS time may be available only at these sporadic time instants.

Terminal 110 may also receive signals from one or more base stations 120 in the cellular system, and may process these terrestrial signals to receive information or to communicate with the cellular system. As part of a synchronization and acquisition process, the terminal may be required to determine the timing of each base station with which it receives data or communicates. For the GSM system, a synchronization burst is periodically transmitted by each base station to provide frame-level synchronization data to the terminals. The timing of each base station may be determined by processing the synchronization bursts transmitted by the base station.

Some cellular systems (e.g., IS-95 and cdma2000 systems) are operated synchronously such that the timing of all base stations is aligned. Moreover, the timing of the base stations in these cellular systems may further be synchronized with (i.e., locked to) GPS time. In this case, the terminal may be able to continually update its internal timing with GPS time, which may be obtained based on signals from the GPS satellites and/or base stations.

However, some cellular systems (e.g., GSM and W-CDMA systems) may be operated asynchronously. For W-CDMA, the base stations may be operated such that they are all synchronized to one another or are all asynchronous to each other. The base stations may also be operated such that some base stations are synchronized while some others are not. The choice of synchronous or asynchronous operation is dependent on the manner in which the system is operated by a network operator. For GSM, the base stations are asynchronous with respect to each other.

For an asynchronous cellular system (e.g., GSM or W-CDMA system), the timing of the base stations is not aligned and may drift over time. The long-term average value of this drift may be zero or may be some non-zero value (i.e., the time difference between the base stations may continually increase or decrease). Because of the asynchronous timing, the frames for these base stations are not likely to start at the same time instant (unless by coincidence). Moreover, the timing of the base stations in the asynchronous cellular system is typically not synchronous with GPS time. For these reasons, the terminal would not be able to update its internal timing, based on time information from these asynchronous base stations, in the same manner as for a synchronous system.

A method and apparatus is provided herein to implement a "virtual" real-time clock at a terminal based on time information from multiple communication systems, one of which may be an asynchronous system (e.g., a GSM or W-CDMA system). The inventor has recognized that, although the base stations in a cellular system may be operated asynchronously, the timing of each base station is derived based on a clock that is typically more accurate than the internal clock of the terminal. For example, while the internal clock of the terminal may have accuracy on the order of 10 ppm or worse, the clock of a base station may have accuracy on the order of ±0.05 ppm or possibly 0.01 ppm (i.e., 100 to 1000 times more accurate). An accurate virtual real-time clock may then be implemented by the terminal based on GPS time from the GPS (whenever available) and the accurate timing of the base stations in the cellular system.

Figure 2:
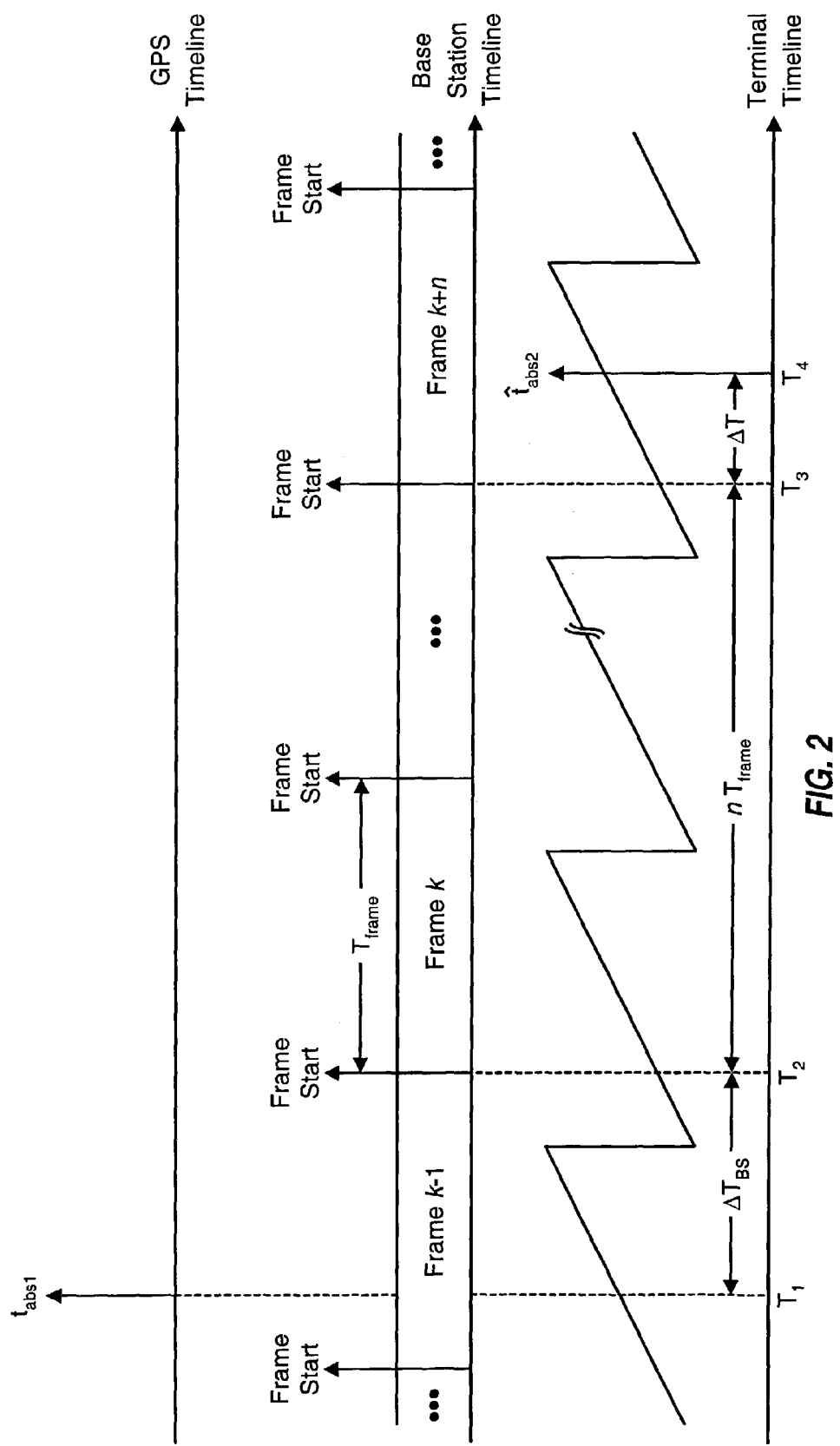
FIG. 2 is a diagram that illustrates an implementation of a virtual real-time clock based on time information from GPS and a cellular system.

FIG. 2 is a diagram that illustrates an implementation of the virtual real-time clock at a terminal based on time information from the GPS and cellular system. FIG. 2 shows three different timelines for the terminal, a base station in the cellular system, and the GPS. These three different timelines result from the use of three different clocks (which are not locked) for the terminal, the base station, and the GPS.

As shown in FIG. 2, the GPS is associated with its own timeline, which is effectively determined based on the extremely accurate atomic clock on earth. The GPS satellite clocks are controlled and corrected to allow the relationship between absolute GPS time and the individual satellite clocks to be very well known at any given moment.

For an asynchronous cellular system, the timing of each base station may be different from that of other base stations in the cellular system. The timing of each base station is determined based on its own clock, which may or may not be locked to some other time reference (e.g., GPS). Nevertheless, the base station's clock frequency is typically much more accurate than the terminal's internal clock frequency. Each base station transmits data in frames of a particular duration defined by the standard being implemented by the cellular system. For simplicity, the timing of only one base station is shown in FIG. 2. The frame period of this base station is denoted as $T_{frame}$, and the start of each frame is shown in FIG. 2.

The terminal typically maintains a counter or a timer that is used to provide "system time" for all processing elements within the terminal. For simplicity, the following description assumes that a counter is maintained to provide system time. This counter is operated based on the terminal's internal clock, which is typically the most inaccurate of all clocks in the three entities (i.e., the terminal, base station, and GPS). The internal clock "free-wheels" unless it is locked to another clock (e.g., the base station clock). The accuracy of the system time at the terminal is directly linked to this internal clock.

Initially, at power up, the counter may be reset (e.g., at some arbitrary time instant) and thereafter increments based on the internal clock. For clarity, the counter is shown as a wrap-around counter having an output that linearly increments with each clock cycle until the maximum counter value is reached, at which time it resets back to the minimum counter value. The counter output may thus be plotted as a saw-tooth waveform. The maximum and minimum counter values may be selected such that each period of the saw-tooth waveform is approximately equal to one frame from the base station. In a typical implementation, additional bits in this counter or another counter may be used to cover a longer time span. For example, another counter may be maintained to count the number of times the first counter wraps around (i.e., the number of frames).

The counter provides system time for the terminal as well as defines the timeline of the terminal. In particular, any given time instant on the terminal timeline is associated with a particular counter value, which is used as the system time for the terminal at that time instant. With no other external time information, the counter is able to provide "relative" time (i.e., the amount of time that has elapsed between two time instants) but is not able to provide "absolute" time (i.e., "true" or actual time at a given time instant).

The virtual real-time clock may be implemented at the terminal as follows. Initially, at time instant $T_1$ on the terminal timeline, the terminal is provided with absolute time $t_{abs1}$ for that time instant. This absolute time $t_{abs1}$ may be the GPS time obtained by processing signals from a number of GPS satellites (e.g., to obtain a position fix), or may be obtained by some other means. The terminal then associates a counter value of $C_1$ for time instant $T_1$ with the absolute time $t_{abs1}$. This then establishes a relationship between the terminal timing and GPS timing.

The terminal also (continually or periodically) processes the signal from the base station to receive messages and/or to communicate with the cellular system. As part of the signal processing, the terminal may detect certain signaling messages (e.g., synchronization bursts) transmitted by the base station to provide synchronization for the terminal. As shown in FIG. 2, the terminal detects the start of frame k as occurring at time instant $T_2$. The terminal further processes the signaling message on frame k to extract the frame number of this frame. The terminal then associates a counter value of $C_2$ for time instant $T_2$ with the start of frame k and further associates the frame number of frame k with time instant $T_2$. This then establishes a relationship between the terminal timing and base station timing.

The terminal may then establish a relationship between the GPS timing and base station timing. In particular, the terminal may determine a time offset $\Delta T_{BS}$ between the time instant $T_1$ for which the absolute time $t_{abs1}$ was received and the time instant $T_2$ for the start of frame k. This time offset may be expressed as:

$$\Delta T_{BS} = T_2 - T_1. \qquad \text{Eq(1)}$$

Since the counter values are used to denote time for the terminal timeline, the time offset $\Delta T_{BS}$ may be determined as $\Delta T_{BS} = (C_2 - C_1)/F_{nom}$, where $F_{nom}$ is the nominal clock frequency and $C_2$ is adjusted to accounted for any wrap-around in the counter since time instant $T_1$.

Thereafter, the terminal may be idle for a length of time. At an arbitrary time instant $T_4$ on the terminal timeline, absolute time may be needed (e.g., for a new position fix). An absolute time estimate $\hat{t}_{abs2}$ at time instant $T_4$ may then be determined in the following manner. First, the start of a frame prior to (or near) time instant $T_4$ (e.g., frame k+n ) is detected as occurring at time instant $T_3$. The time difference $\Delta T$ between the start of frame k+n and the time instant $T_4$ where the absolute time estimate is needed may then be determined as:

$$\Delta T = T_4 - T_3. \qquad \text{Eq (2)}$$

Again, the time difference $\Delta T$ may be determined as $\Delta T = (C_4 - C_3)/F_{nom}$, where $C_3$ and $C_4$ are the counter values at time instants $T_3$ and $T_4$, respectively.

The number of whole frames between time instants $T_2$ and $T_3$ is also determined. This may be obtained based on the frame numbers extracted from the signaling messages transmitted in frames k and k+n, or based on another counter maintained by the terminal to count the number of frames. The absolute time $t_{abs2}$ at time instant $T_4$ may then be estimated as:

$$\hat{t}_{abs2} = t_{abs1} + \Delta T_{BS} + nT_{frame} + \Delta T \cong t_{abs2}, \qquad \text{Eq (3)}$$

where n is the number of whole frames between time instants $T_2$ and $T_3$.

As shown in equation (3), the absolute time estimate, $\hat{t}_{abs2}$, is derived based on four terms. The term $t_{abs1}$ is very accurate and considered as having no errors. For example, GPS time may be provided with accuracy on the order of 100 nsec. The term $nT_{frame}$ is based on the timing of the base station, in which case $T_{frame}$ may be accurate to 0.1 ppm or 0.01 ppm. The term $nT_{frame}$ typically covers a large portion of the elapsed time between time instants $T_1$ and $T_4$. The terms $\Delta T_{BS}$ and $\Delta T$ are based on the timing of the terminal, which typically has the worse accuracy of all three entities. However, the time period covered by the terms $\Delta T_{BS}$ and $\Delta T$ is typically short relative to the elapsed time between time instants $T_1$ and $T_4$. The absolute time estimate, $\hat{t}_{abs2}$, is thus an accurate estimate of the absolute time $t_{abs2}$ at time instant $T_4$ since (1) most of the elapsed time between time instants $T_1$ and $T_4$ (i.e., $nT_{frame}$) is estimated based on the accurate base station timing and (2) only a relatively small portion of the elapsed time (i.e., $\Delta T_{BS}+\Delta T$) may have been estimated based on the less accurate terminal timing.

As illustrated in FIG. 2, the virtual real-time clock is effectively implemented based on time information from multiple communication systems (e.g., GPS and cellular system). The time information from one communication system (e.g., GPS) may be provided in the form of accurate absolute time (e.g., $t_{abs1}$) at a particular time instant. The time information from the other communication system (e.g., a cellular system) may be provided in the form of accurate relative time (e.g., $nT_{frame}$, which is based on accurate frame-level timing). The virtual real-time clock may then provide an accurate estimate of the absolute time at any arbitrary time instant based on the absolute time from one communication system and the relative time from the other communication system. A less accurate clock (e.g., the internal clock within the terminal) may be used for any time period not covered by the relative time from the other communication system, as described above.

The timing of the base station may further be calibrated (or compensated) based on accurate absolute time obtained for multiple time instants. For example, if accurate absolute time $t_{abs2}$ is available from the GPS at time instant $T_4$ (instead of having to be estimated as described above), then the time period covered by each frame from the base station may be derived as:

$$T_{frame} = \frac{t_{abs2} - t_{abs1} - \Delta T_{BS} - \Delta T}{n}. \quad \text{Eq (4)}$$

As shown in equation (4), the frame period, $T_{frame}$, is derived based on four terms. The terms $t_{abs1}$ and $t_{abs2}$ are very accurate and considered as having no errors. The terms $\Delta T_{BS}$ and $\Delta T$ are based on the timing of the terminal. The effect of the terminal timing error on the derivation of the frame period, $T_{frame}$, reduces if $(t_{abs2}-t_{abs1})$ is large relative to $(\Delta T_{BS}+\Delta T)$. The frame period, $T_{frame}$, derived from equation (4) may be stored and thereafter used as the frame period for this base station whenever absolute time needs to be estimated. The frame period, $T_{frame}$, may also be updated as new accurate absolute time become available. The timing calibration described above is equivalent to calculating the frequency offset of the base station.

The virtual real-time clock may also be implemented for an asynchronous communication system (e.g., a GSM or W-CDMA system). As noted above, the timing for the base stations in such an asynchronous communication system may not be aligned but is nevertheless accurate. While idle or during communication with the cellular system, the terminal may be handed off (or "reselected") from one base station to another as it moves in and out of the coverage areas of these base stations. The timing of each base station may be used to implement the virtual real-time clock as it becomes available.

Figure 3:
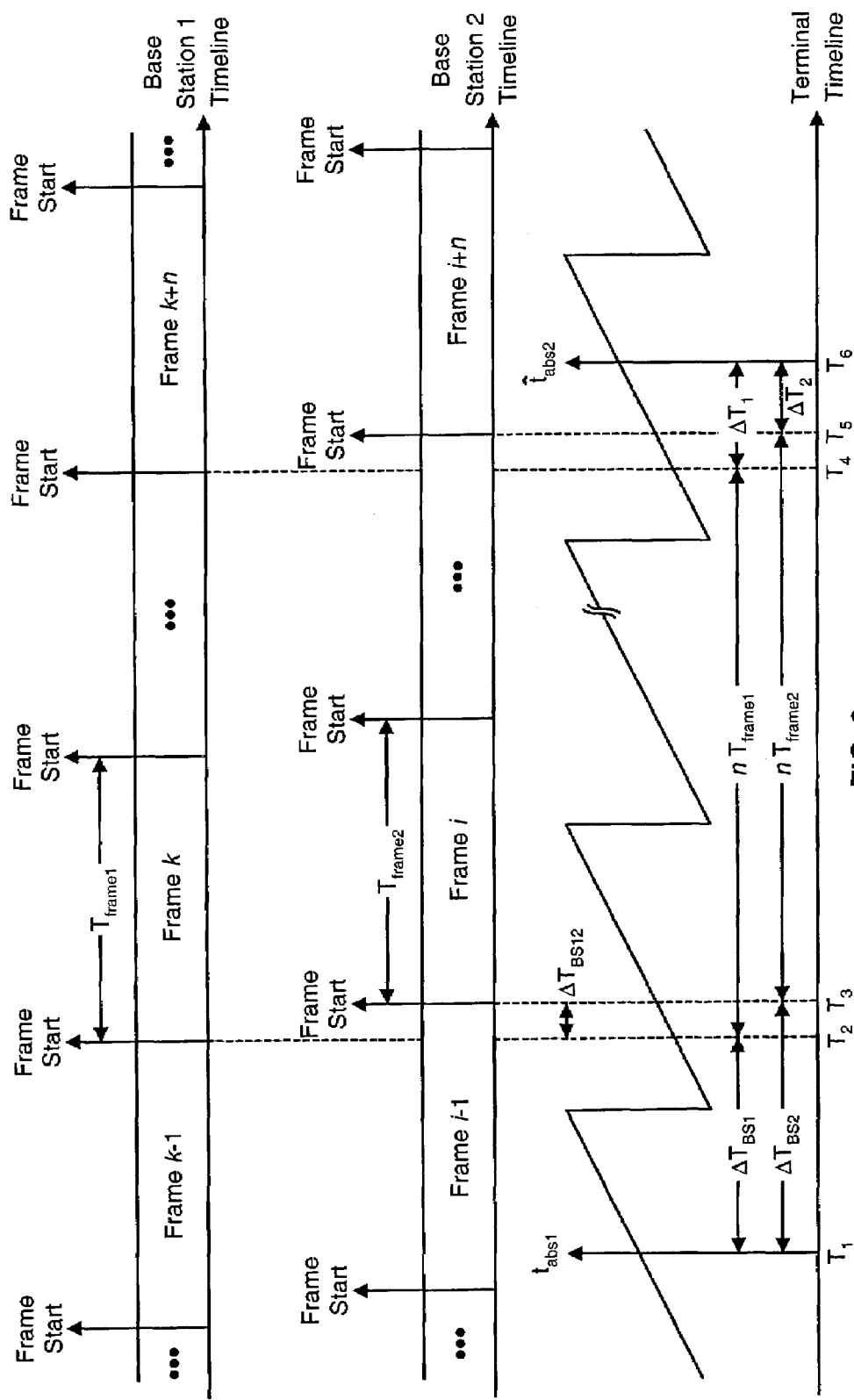
FIG. 3 is a diagram that illustrates an implementation of the virtual real-time clock based on time information from the GPS and two asynchronous base stations in the cellular system.

FIG. 3 is a diagram that illustrates an implementation of the virtual real-time clock based on time information from the GPS and two asynchronous base stations in a cellular system. FIG. 3 shows three different timelines for the terminal and the two base stations. These three different timelines result from the use of three different clocks (which are not locked) for the terminal and the two base stations. The timeline for the GPS is not shown for simplicity.

Initially, at time instant $T_1$ on the terminal timeline, the terminal is provided with absolute time value $t_{abs1}$, which may be the GPS time, for that time instant. The terminal then associates a counter value of $C_1$ for time instant $T_1$ with the absolute time $t_{abs1}$, which then establishes a relationship between the terminal timing and GPS timing.

Thereafter, the terminal detects the start of frame k from base station 1 occurring at time instant $T_2$. The terminal then associates a counter value of $C_2$ for time instant $T_2$ with the start of frame k from base station 1. This then establishes a relationship between the terminal timing and base station 1 timing. The terminal may establish a relationship between the GPS timing and base station 1 timing by determining the time offset $\Delta T_{BS1}$ between the time instant $T_1$ when the absolute time $t_{abs1}$ was received and the time instant $T_2$ for the start of frame k from base station 1, as shown above in equation (1).

The terminal also receives a transmission from base station 2. To establish a timing relationship between base station 2 and GPS, the terminal first detects the start of frame i from base station 2 as occurring at time instant $T_3$. The terminal then associates a counter value of $C_3$ for time instant $T_3$ with the start of frame i from base station 2. The time difference $\Delta T_{BS12}$ between the start of frames k and i for base stations 1 and 2, respectively, may then be determined as:

$$\Delta T_{BS12}=T_3-T_2. \quad \text{Eq (5)}$$

The terminal may then establish a relationship between the GPS timing and base station 2 timing by determining the time offset $\Delta T_{BS2}$ between the time instant $T_1$ for which the absolute time $t_{abs1}$ was received and the time instant $T_3$ for the start of frame i from base station 2, as follows:

$$\Delta T_{BS2}=\Delta T_{BS1}+\Delta T_{BS12}. \quad \text{Eq (6)}$$

At an arbitrary time instant $T_6$ on the terminal timeline, absolute time may be needed (e.g., for a new position fix). The absolute time $t_{abs2}$ at time instant $T_6$ may then be estimated based on the timing of base station 1 and/or 2, which may be dependent on the base station(s) from which the terminal can still receive frames near time instant $T_6$. The process to estimate the absolute time $t_{abs2}$ at time instant $T_6$ based on the timing of base station 1 may be achieved as described above for FIG. 2.

The process to estimate the absolute time $t_{abs2}$ at time instant $T_6$ based on the timing of base station 2 may be achieved as follows. First, the start of frame i+n near time instant $T_6$ is detected as occurring at time instant $T_5$. The time difference $\Delta T_2$ between the start of frame i+n and the time instant $T_6$ where the absolute time estimate is needed may then be determined as:

$$\Delta T_2=T_6-T_5. \quad \text{Eq (7)}$$

The number of whole frames between time instants $T_3$ and $T_5$ is also determined (e.g., based on the frame numbers extracted from the signaling messages transmitted in frames i and i+n, or based on another counter maintained by the terminal to count the number of frames). The absolute time $t_{abs2}$ at time instant $T_6$ may then be estimated as:

$$\hat{t}_{abs2} = t_{abs1} + \Delta T_{BS2} + nT_{frame} + \Delta T_2 \cong t_{abs2}, \qquad \text{Eq (8)}$$

where n is the number of whole frames between time instants $T_3$ and $T_5$.

As shown in equation (8), the absolute time estimate, $\hat{t}_{abs2}$, is derived based on four terms. The term $t_{abs1}$ is very accurate and the term $nT_{frame}$ is based on the timing of base station 2, which is also accurate. The terms $\Delta T_{BS2}$ and $\Delta T_2$ for base station 2 are derived based on the timing of the terminal, and has approximately the same amount of error as the terms $\Delta T_{BS1}$ and $\Delta T_1$ derived for base station 1. Thus, the virtual real-time clock may be accurately maintained even as the terminal is handed off from one base station to another in an asynchronous cellular system.

For simplicity, FIG. 3 shows the derivation of the time offsets $\Delta T_{BS1}$ and $\Delta T_{BS2}$ based on two frames k and i that are received within one frame period of time instant $T_1$. In general, frames transmitted at any time instants by the asynchronous base stations may be used to obtain the relative time information. The phases (i.e., bit-level timing) and numbers of these frames may be determined (e.g., from the signaling messages transmitted in these frames) and used to derive the time offsets $\Delta T_{BS1}$ and $\Delta T_{BS2}$. Each time offset may be less than one frame period (i.e., $\Delta T_{BS} < T_{frame}$) or greater than one frame period (i.e., $\Delta T_{BS} > T_{frame}$).

The handoff between base stations may also occur at any time and may be accounted for (e.g., such that the time offset for each base station covers only the time period for which relative time is not available). Moreover, the virtual real-time clock may use the relative time information from any number of asynchronous base stations. In general, the relative time information from each base station may be used for any applicable time period for which frames are received from that base station. The elapsed time between any two time instants may then be estimated by piece-meal combination of relative time from a number of base stations, as follows:

$$\sum_{i=1}^{N_B} n_i T_{frame,i},$$

where $n_i$ is the number of frames covered by the relative time from base station i, $T_{frame,i}$ is the frame period for base station i, and $N_B$ is the number of base stations used to estimate the elapsed time.

The relative time information may be obtained by processing signaling messages transmitted by the base stations in the cellular system. Each standard defines the specific signaling message to be used, the frequency of its transmission, and so on. For clarity, the signaling message for GSM used to obtain relative time information is described below.

Figure 4:
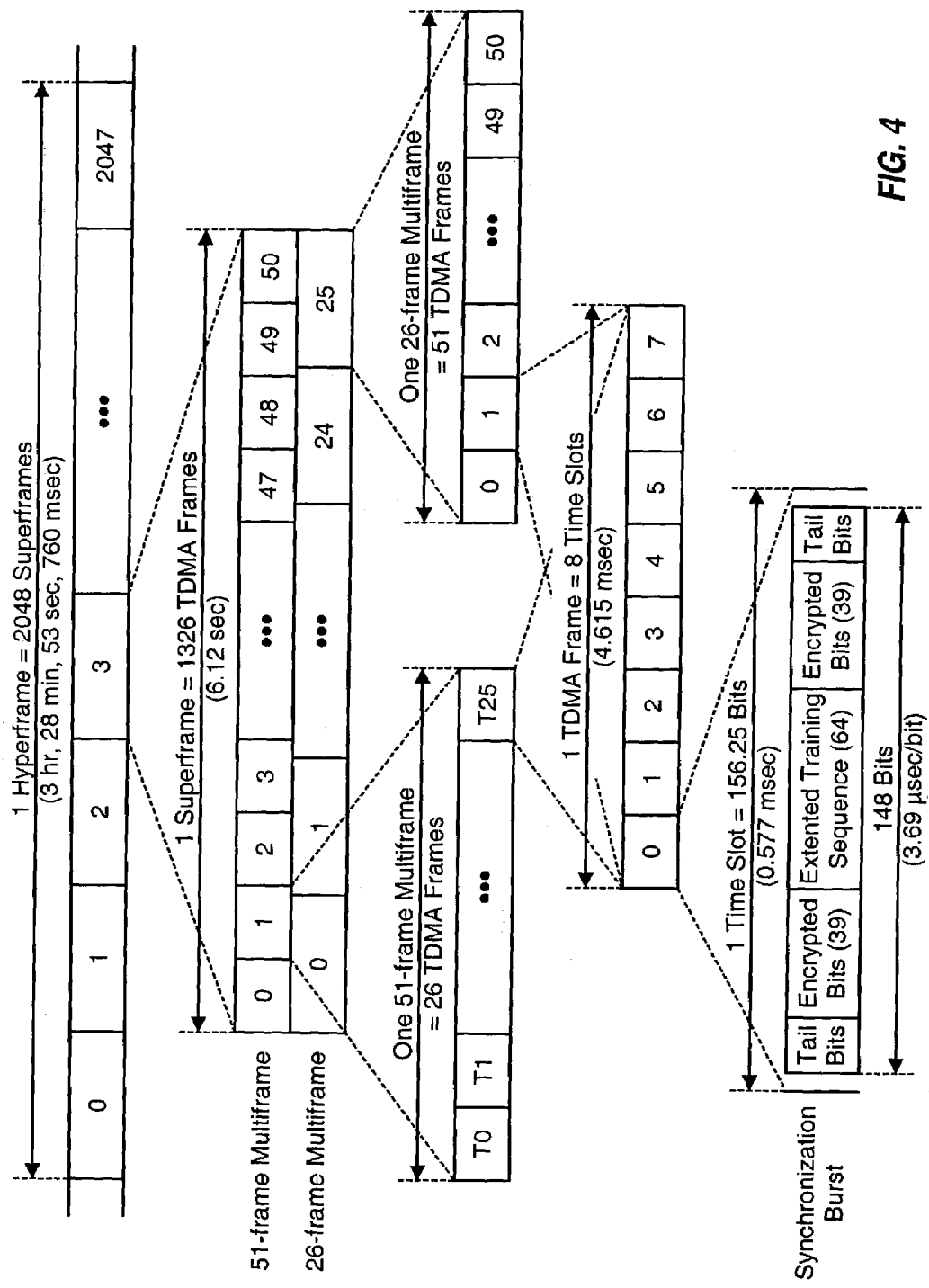
FIG. 4 is a diagram illustrating the frame structure for a GSM system.

FIG. 4 is a diagram illustrating the frame structure for a GSM system. A hyperframe is defined to include 2048 superframes and covers a time period of 3 hours, 28 minutes, 53 seconds, and 760 msec. Each superframe includes 1326 TDMA frames and may be partitioned into a number of 51-frame multiframes or 26-frame multiframes. Each TDMA frame includes 8 time slots and covers 4.615 msec. Each time slot includes 156.25 bits and covers 0.577 msec, and each bit has a duration of 3.69 μsec.

Each base station periodically transmits synchronization bursts, which may be used by the terminals for synchronization to the base station and to derive timing. Five synchronization bursts are transmitted every 51 frames, which corresponds to a rate of approximately 21.2 Hz. As shown in FIG. 4, a synchronization burst comprising 148 bits may be transmitted on the first time slot of a TDMA frame. Each synchronization burst includes 78 encrypted bits that may be decrypted to obtain a 19-bit reduced TDMA frame number (RFN) and a 6-bit base transceiver system identification code (BSIC). The 19-bit reduced TDMA frame number identifies a specific TDMA frame, in which the synchronization burst is transmitted, within the hyperframe. The BSIC identifies a specific base station from which the synchronization burst was transmitted, and may be used to uniquely identify each base station. The start of each received synchronization burst may be determined and used as the frame start shown in FIGS. 2 and 3. The 19-bit reduced TDMA frame number may be used to determine the number of frames that have been transmitted between any two synchronization bursts. Since each bit has a duration of 3.69 μsec, relative time may be obtained to within 3.69 μsec resolution from the synchronization bursts.

Figure 5:
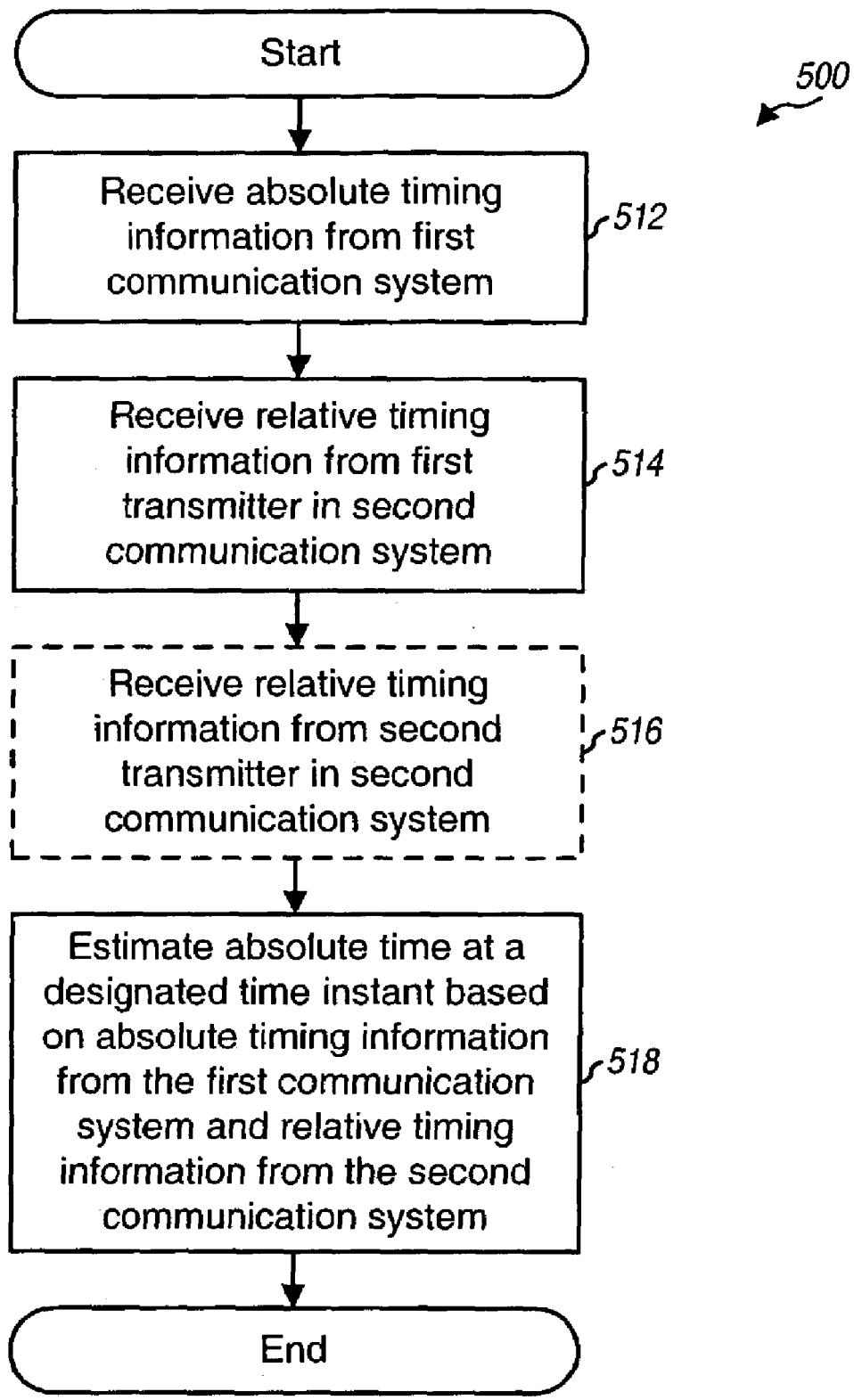
FIGS. 5 and 6 are flows diagram of two embodiments of a process for providing an estimate of absolute time based on time information from multiple communication systems.

FIG. 5 is a flow diagram of an embodiment of a process 500 for providing an estimate of absolute time based on time information from multiple communication systems. Absolute time information is received from a first communication system (e.g., GPS) (step 512). The absolute time information may be in the form of absolute time for a specific time instant. Relative time information is also received from a first transmitter in a second communication system (e.g., a cellular system) (step 514). The relative time information may be in the form of signaling messages (e.g., synchronization bursts) periodically transmitted by the first transmitter. Relative time information may also be received from a second transmitter in the second communication system (step 516, which is optional and shown as a dashed box). The first and second transmitters may be operated asynchronously. An estimate of absolute time at a designated time instant is provided based on the absolute time information from the first communication system and the relative time information from the first and (possibly) second transmitters in the second communication system (step 518).

Figure 6:
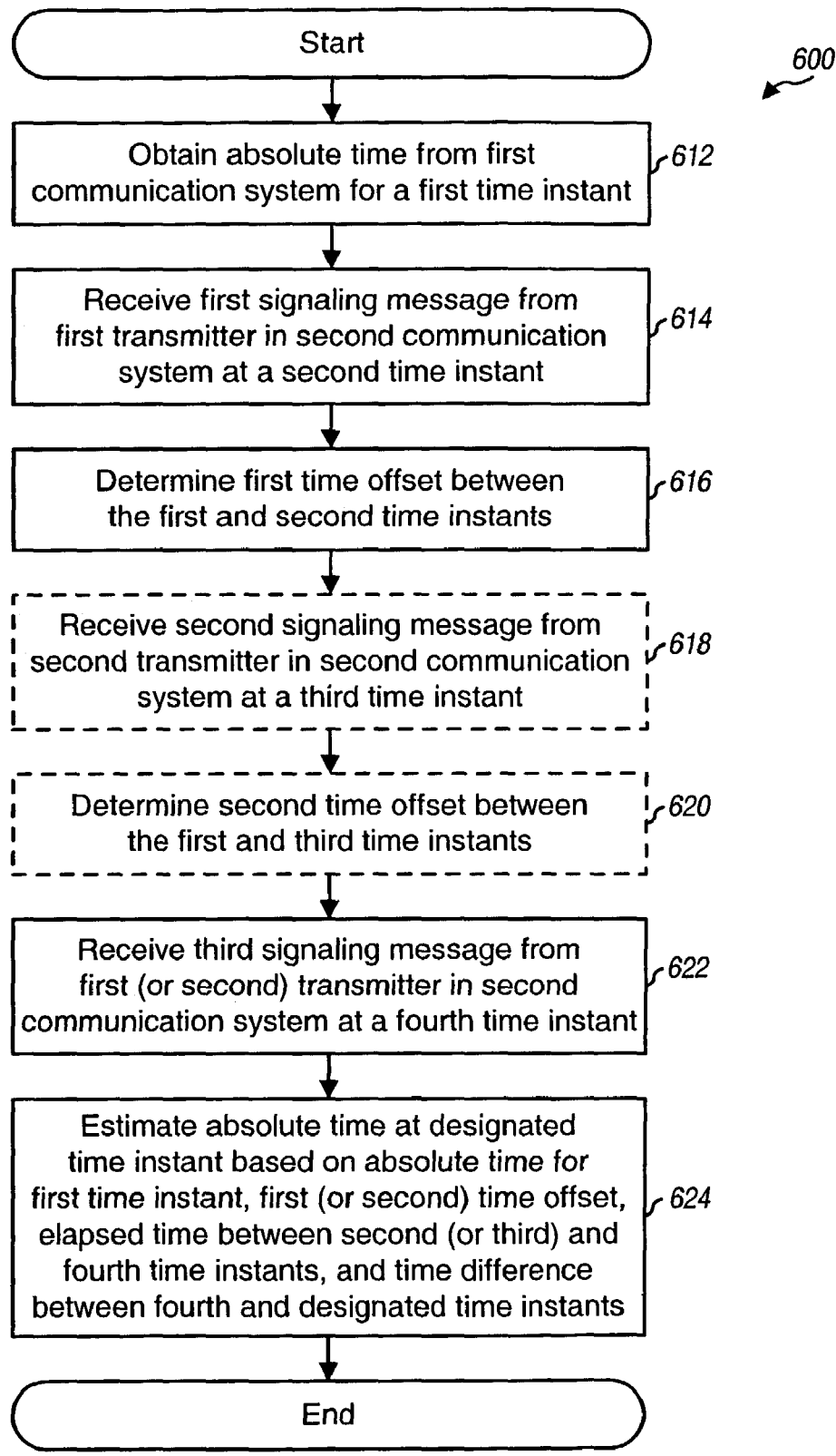

FIG. 6 is a flow diagram of an embodiment of a process 600 for providing an estimate of absolute time based on time information from a number of communication systems. Initially, absolute time is obtained from a first communication system (e.g., GPS) for a first time instant (step 612). A first signaling message is received from a first transmitter in a second (e.g., cellular) communication system at a second time instant (step 614). A first time offset between the first and second time instants is then determined (step 616). A second signaling message may also be received from a second transmitter in the second communication system at a third time instant (step 618, which is optional and shown as a dashed box). A second time offset between the first and third time instants may then be determined (step 620, which is also optional). A third signaling message may thereafter be received from either the first or second transmitter at a fourth time instant (step 622).

If the third signaling message is from the first transmitter, then an estimate of absolute time at a designated time instant may be determined based on (1) the absolute time for the first time instant (e.g., $t_{abs1}$ in FIG. 3), (2) the first time offset (e.g., $\Delta T_{BS1}$), (3) an elapsed time between the second and fourth time instants (e.g., $nT_{frame1}$), and (4) the time difference between the fourth and designated time instants (e.g., $\Delta T_1$,) (step 624). Alternatively, if the third signaling message is from the second transmitter, then the absolute time estimate for the designated time instant may be determined based on (1) the absolute time for the first time instant, (2) the second time offset (e.g., $\Delta T_{BS2}$), (3) an elapsed time between the third and fourth time instants (e.g., $nT_{frame2}$), and (4) the time difference between the fourth and designated time instants (e.g., $\Delta T_2$).

In general, the virtual real-time clock may be implemented based on time information received from multiple communication systems. In one embodiment, at least one communication system (e.g., GPS) provides absolute time for the virtual real-time clock, and at least one other communication system (e.g., a cellular system) provides relative time for the virtual real-time clock.

In another embodiment, the communication system that provides relative time information may also provide absolute time information (e.g., in messages) at designated time instants. For example, a base station in the cellular system may (periodically or when requested) transmit a message with the absolute time at the time of the message transmission (e.g., the start of the frame with the message). Techniques for receiving time from information from a cellular network are described in U.S. Pat. No. 5,945,944, entitled "Method and Apparatus for Determining Time for GPS Receivers," issued Aug. 31, 1999, which is incorporated herein by reference.

The virtual real-time clock may be time-stamped with absolute time as it becomes available. Absolute times for two or more time instants may also be used to calibrate the relative time from the other communication system.

The relative time information may be provided by various means. One common means is via the transmission of signaling messages at selected time instants such that the time difference between any two signaling messages can be ascertained. As examples, the signaling messages may be (1) the synchronization bursts transmitted by each base station in the GSM system, as described in FIG. 4, (2) the system frame number (SFN) transmitted by each base station in the W-CDMA system, (3) paging indicators transmitted at known time intervals, and so on. Various types of signaling message may be used, and this is within the scope of the invention.

The relative time information from the cellular system is typically readily available to a terminal. While in active communication with at least one base station, the terminal continually determines frame-level timing and can use this information to update the virtual real-time clock. Even while idle, the terminal periodically wakes up to check for page messages on a paging channel alerting it of incoming calls. As part of the processing of the paging channel for page messages, the terminal determines frame-level timing and can use this information to update the virtual real-time clock.

The virtual real-time clock may be used to provide an accurate estimate of absolute time at any designated time instant. This accurate time estimate may be advantageously used for various applications, one of which is position determination. In particular, the accurate time estimate may be used to (1) provide a position fix in a shorter period of time and/or (2) provide higher sensitivity in the processing of the signals used for the position fix. The benefits attainable with the accurate time estimate for position fixes based on GPS signals are described below.

The position of a terminal may be determined based on (1) distances to a sufficient number of transmitters, which are used as reference points, and (2) the locations of these transmitters. For GPS, the terminal can estimate the distance to each GPS satellite by measuring the time required for a signal to travel from the satellite to the terminal. If the time the signal is transmitted from the GPS satellite is known (e.g., stamped or encoded in the signal), then the travel time of the signal can be determined by observing the time the signal is received at the terminal (based on the terminal's internal clock). Typically however, the amount of time between transmission and reception cannot be exactly determined because of offsets between the clocks at the terminal and GPS satellite. Thus, a "pseudo-range" is typically derived based on the difference between a reference time and the time that the signal is received. The pseudo-range thus represents the relative distance between the terminal and the GPS satellite from which the signal was received.

Figure 7:
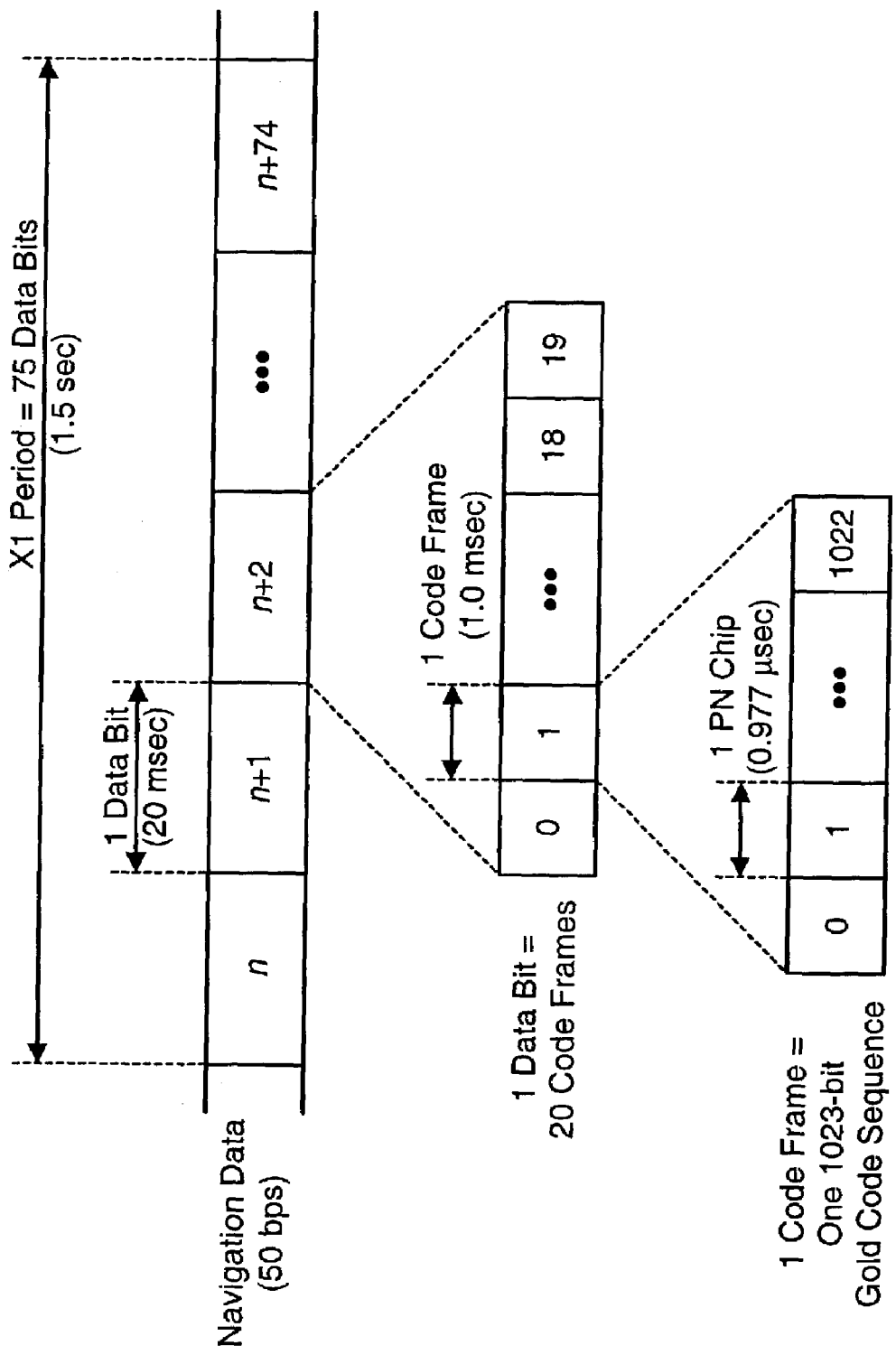
FIG. 7 is a diagram illustrating the data transmission format for a GPS signal.

FIG. 7 is a diagram illustrating the data transmission format for a GPS signal. Each GPS satellite transmits navigation data, which includes various types of information such as satellite Ephemeris, GPS system time (e.g., bit of week (BOW) information), correction data, and so on. The navigation data is provided at a rate of 50 bits per second (bps), and each data bit covers a 20 msec time period. A X1 period is defined as covering 75 data bits, which is 1.5 sec.

The 50 bps navigation data is spectrally spread over a 1.023 MHz bandwidth by spreading (or scrambling) the data with a continuous pseudo-random number (PN) sequence generated by repeating a 1023-bit Gold code sequence. In particular, each data bit is composed of 20 code frames, and each code frame is composed of one 1023-bit Gold code sequence. The Gold code sequence has a chip rate of 1.023 Mcps, and each PN or Gold code bit covers a 0.977 µsec chip period.

For GPS, absolute time may be partitioned into three different time components: bit of week (BOW), epoch (in bit), and sub-code frame. (These three time components may be viewed as being analogous to hour, minute, and second used for denoting time of the day.) Each time component covers a different time range and has a different time resolution. In particular, sub-code frame timing covers a range of 0 to 1 msec and has chip-level resolution, epoch in bit timing covers a range of 1 msec to 20 msec and has code frame (or 1 msec) resolution, and BOW time information covers a range of 20 msec and beyond and has data bit (or 20 msec) resolution. Absolute time may be represented by the combination of these three time components.

Each of the three time components may be obtained from the GPS signal based on different signal processing by the GPS receiver. In particular, sub-code frame timing may be obtained by performing match filtering of the received GPS signal. This can be achieved by correlating the received GPS signal with a locally generated PN sequence at a particular phase corresponding to a hypothesis being evaluated. The correlation results in a high output value if the locally generated PN sequence is time-aligned with the PN sequence used to spread the navigation data in the received GPS signal, and a low output value otherwise. The correlation can thus provide chip-level timing.

Epoch (in bit) timing may be obtained by performing edge detection of the navigation data bits. Each data bit is transmitted over a 20 msec time period covering 20 code frames. The 20 code frames for each data bit has a polarity determined by that data bit. Once the chip-level timing has been determined by the match filtering, the 1023 chips of each code frame may be coherently accumulated to provide a corresponding code frame value. If 20 code frame values for a single data bit are further accumulated, then a high bit value is obtained. However, if 20 code frame values for two data bits with opposite polarity are accumulated, then a lower bit value is obtained, with the exact value being determined by the number of code frames associated with each of the two data bits. Thus, by accumulating over different sets of 20 code frames, the edge detection is able to determine the start of each data bit, which may then be used to determine code-frame (or 1 msec) level timing.

BOW time information may be obtained by demodulating the received data bits and extracting the various types of information included in the navigation data. BOW time information may also be obtained using a pattern matching technique that compares received data bits with predicted data bits. The pattern matching technique is described in U.S. Pat. Nos. 5,812,087, 6,052,081 and 6,239,742, which are incorporated herein by reference. The data format for the navigation data is described in detail in a document entitled "Global Position System Standard Positioning Service Signal Specification," $2^{nd}$ Edition, Jun. 2, 1995, which is readily available in the art and incorporated herein by reference.

Table 1 lists the three time components, the time range and resolution associated with each time component, the processing technique used to recover each time component, and an approximate amount of time needed to recover each time component (which assumes that the time components with finer resolution, if any, have already been recovered).

TABLE 1

| Time Component | Time Range | Resolution | Processing Technique | Processing Time |
|---|---|---|---|---|
| BOW | >20 msec | 20 msec | De-modulate Data | >5 seconds |
| Epoch (in bit) | 1 to 20 msec | 1 msec | Edge Detection | ~2–3 seconds |
| Sub-Code Frame | 0 to 1 msec | 0.977 µsec | Match Filtering | ~1–2 seconds |

The processing to obtain the three time components is typically performed in sequential order, in increasing coarse time resolution, such that sub-code frame (chip-level) timing is obtained first, epoch in bit (code-frame level) timing is obtained next, and BOW time information is obtained last. The processing time to obtain each time component from the GPS signal is thus cumulative (i.e., equal to the processing time for that time component plus the processing time for all finer time components). As can be seen from Table 1, the processing to recover BOW time information may be relatively long.

Referring back to FIG. 2, the terminal may be idle for a period of time and may then be commanded to perform a position fix at time instant $T_4$. To compute the position fix, the receiver can skip the processing for any time component that it has a priori knowledge of. In particular, if the absolute time estimate $\hat{t}_{abs2}$ for time instant $T_4$ has an uncertainty of less than ±0.5 msec, then the GPS receiver only needs to determine sub-code frame (chip-level) timing to compute the position fix. Otherwise, if this absolute time estimate $\hat{t}_{abs2}$ has an uncertainty of less than or equal to ±10 msec, then the GPS receiver would need to determine both sub-code frame and epoch in bit timing to compute the position fix. And if the absolute time estimate $\hat{t}_{abs2}$ has an uncertainty of greater than ±10 msec, then the GPS receiver would need to determine sub-code frame, epoch in bit, and BOW timing to compute the position fix.

The virtual real-time clock can be used to provide accurate absolute time estimates. In particular, for position determination, the virtual real-time clock may be used to provide accurate absolute time estimates such that epoch in bit and BOW timing need not be recovered. This would then reduce the amount of time needed to obtain a position fix since only the sub-code frame (chip-level) timing needs to be determined (which has the shortest processing of all three time components).

The accurate absolute time estimates provided by the virtual real-time clock may also provide higher sensitivity in processing a GPS signal. In many instances, the GPS signal may be received with a low or poor signal quality because of (1) signal attenuation by the long propagation path between the GPS satellite and the receiver, (2) obstructions in the propagation path, and so on. If the epoch in bit and BOW timing is known a priori, then the received GPS signal may be processed in a manner to improve the recovery of the chip-level timing.

Referring back to FIG. 7, if the epoch in bit timing is known, then the start of each data bit can be determined. In that case, coherent accumulation (i.e., the correlation) may be performed over an entire data bit (i.e., bit synchronous integration) instead of over each code frame (which is only ¹⁄₂₀-th the duration of a data bit). The longer coherent accumulation interval allows for improved detection of chip-level timing in a degraded received GPS signal. This then allows the GPS receiver to provide a position fix based on received GPS signals with lower signal-to-noise ratio (SNR). The sensitivity of the GPS receiver can thus be enhanced with knowledge of epoch in bit timing, which then allows the receiver to provide position fixes in more harsh environments.

Accurate time is also needed to provide accurate estimates of the location of the GPS satellites used for a position fix. Each satellite transmits "Ephemeris" information, which includes a high accuracy modeled prediction of its own orbit, as tracked and reported by tracking stations on earth. The Ephemeris is provided in a form of a function with time as an input variable. Since each GPS satellite moves at a rate of approximately 3600 m/sec, an accurate estimate of absolute time (e.g., to within a few µsec) is needed to derive an accurate estimate of the satellite location. The absolute time estimate from the virtual real-time clock may be provided as the time input to the function to obtain an initial position estimate for a satellite. A pseudo-range from the terminal to the initial satellite position estimate can then be computed. The terminal can search for the signal transmitted by the satellite under the assumption that the computed pseudo-range is correct. Once the code phase is obtained, the other two time components can be resolved. The use of an initial time estimate for processing GPS signal is described in U.S. Pat. Nos. 5,945,944, 6,150,980, and 6,215,442, which are incorporated herein by reference.

Figure 8:
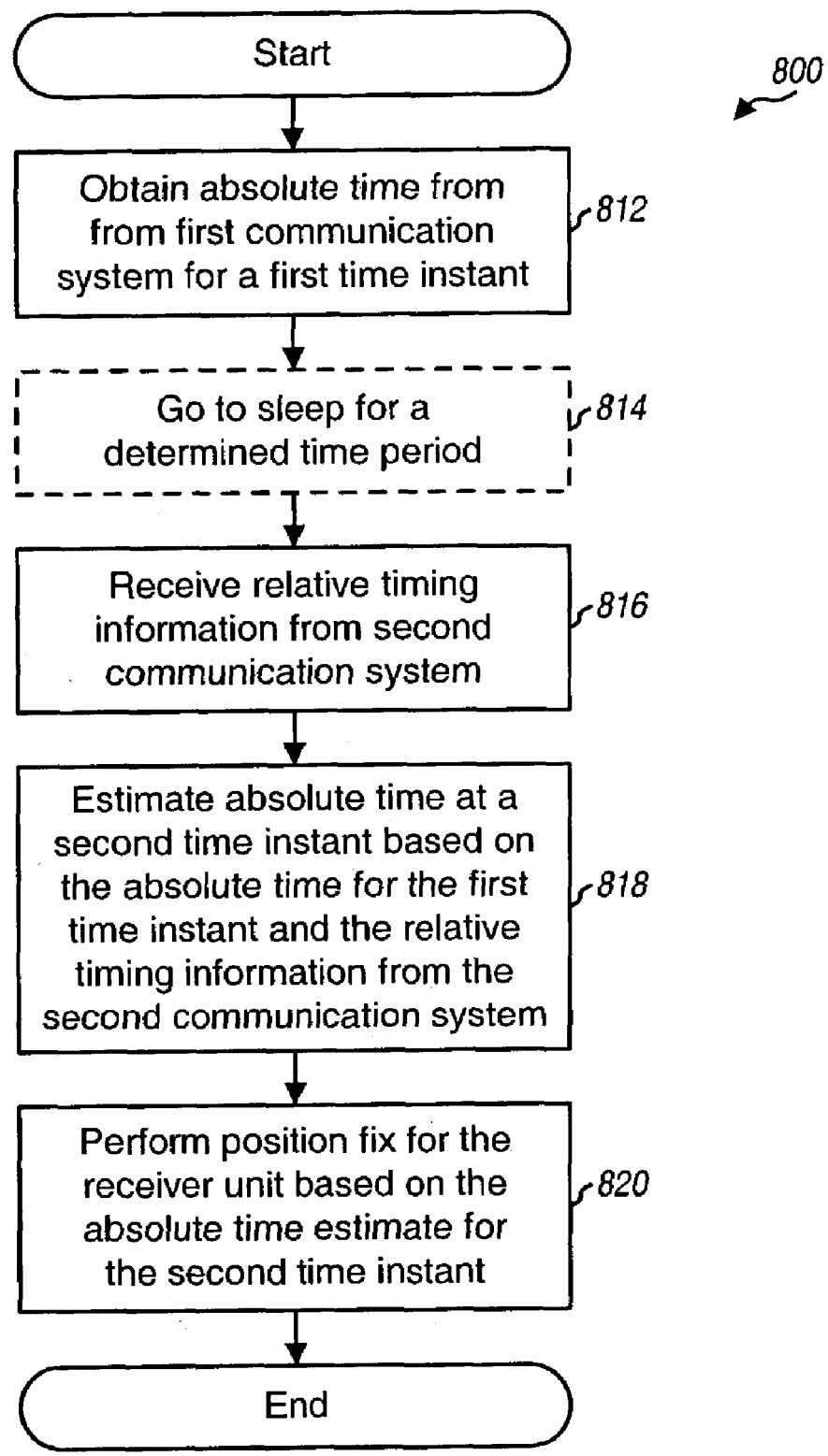
FIG. 8 is a flow diagram of an embodiment of a process for determining the position of a receiver unit based on an accurate absolute time estimate from the virtual real-time clock.

FIG. 8 is a flow diagram of an embodiment of a process 800 for determining the position of a receiver unit based on an accurate absolute time estimate from a virtual real-time clock. The receiver unit may be located within a wireless terminal in a wireless communication system. Initially, absolute time is obtained from the first communication system (e.g., GPS) for a first time instant (step 812). This absolute time may be obtained as one of the results of a position fix performed for the first time instant. Thereafter, the receiver unit may go to sleep for a time period that may be determined based on the stability of the timing/frequency of a second communication system used to provide relative time information for the virtual real-time clock (step 814, which is optional). While the receiver unit is asleep, relative time information is received from the second communication system (step 816). Absolute time at a second time instant may then be estimated based on the absolute time for the first time instant and the relative time information from the second communication system (step 818). A position fix is then performed by the receiver unit based on the absolute time estimate for the second time instant (step 820).

The virtual real-time clock may also be used to provide accurate absolute time estimates for other applications, and this is within the scope of the invention. For example, the absolute time estimates may be used for communication (e.g., transfer between synchronous and asynchronous systems), astronomy, photography, cryptography (e.g., security systems), and so on.

In FIG. 1, terminal 110 may be any device capable of receiving and processing signals from multiple communication systems to obtain time information. In one embodiment, terminal 110 is a cellular telephone capable of receiving signals from a number of transmitters. In other embodiments, terminal 110 may be an electronics unit (e.g., a computer terminal, a personal digital assistant (PDA), and so on) having a wireless modem, a receiver unit capable of receiving signals from satellites and/or base stations, or any other type of receiver.

Figure 9:
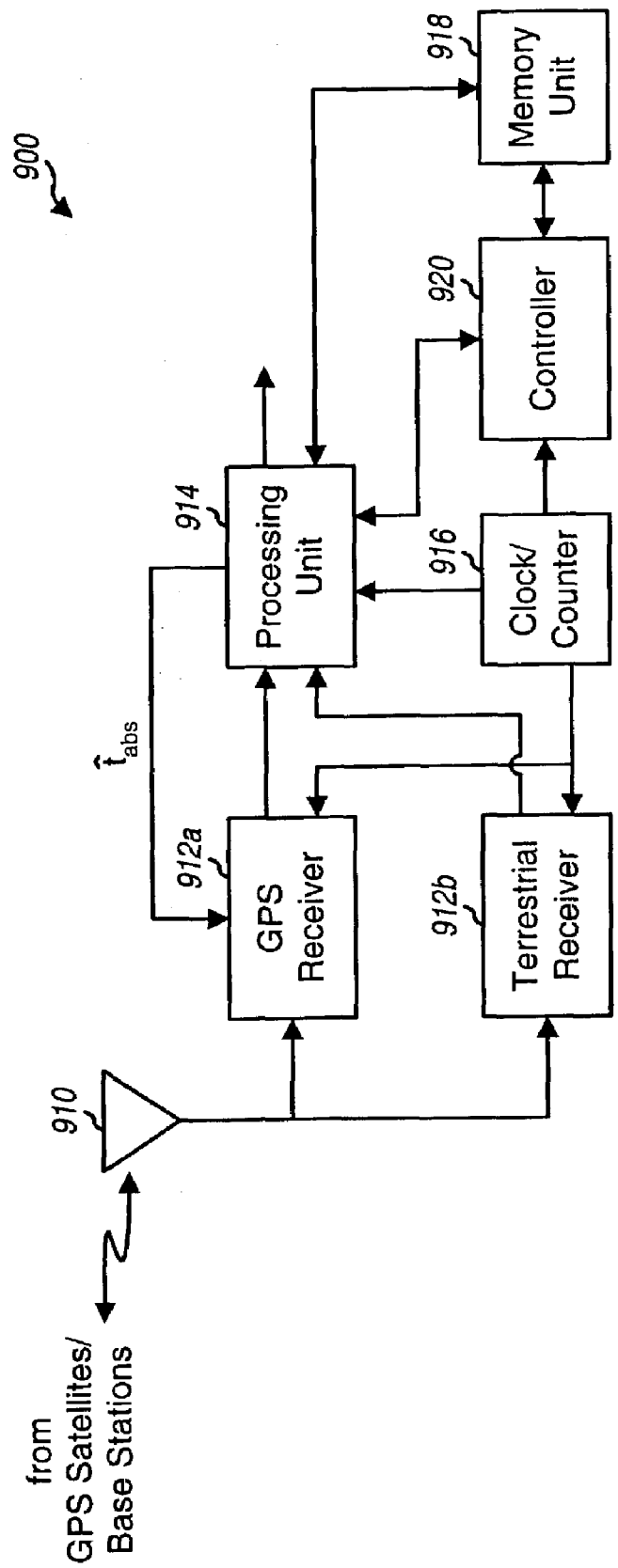
FIG. 9 is a block diagram of an embodiment of a receiver unit, which may be a component of the wireless terminal.

FIG. 9 is a block diagram of an embodiment of a receiver unit 900, which may be a component of wireless terminal 110. Receiver unit 900 may be designed with the capability to process signals from multiple communication systems such as the GPS and cellular system. In the embodiment shown in FIG. 9, receiver device 900 includes an antenna 910, a GPS receiver 912a, a terrestrial receiver 912b, a processing unit 914, a clock/counter (or timer) unit 916, a memory unit 918, and a controller 920.

Antenna 910 receives signals from a number of transmitters, which may be any combination of GPS satellites and/or base stations, and provides the received signal to GPS and terrestrial receivers 912a and 912b. GPS receiver 912a includes front-end circuitry (e.g., RF circuitry and/or other processing circuitry) that processes signals transmitted from GPS satellites to derive information which may be used for position determination. The processing by GPS receiver 912a to extract the pertinent information from the GPS signals is known in the art and not described in detail herein. GPS receiver 912a provides to processing unit 914 various types of information such as, for example, time information (e.g., absolute time), the identities and locations of the transmitters whose signals are received, and so on. Terrestrial receiver 912b includes front-end circuitry that processes the signals transmitted from base stations and may provide relative time information derived from these signals. For example, terrestrial receiver 912b may determine the frame-level timing of a received frame. The absolute time information from GPS receiver 912a and the relative time information from terrestrial receiver 912b may be used to implement the virtual real-time clock.

Processing unit 914 may be designed to perform various functions. For example, processing unit may (e.g., when directed) perform a position fix for receiver unit 900 based on the GPS and/or cellular system. Processing unit 914 may further implement the virtual real-time clock based on the absolute time information obtained from the GPS and the relative time information obtained from the cellular system. When requested, processing unit 914 can estimate absolute time at a designated time instant and provide this absolute time estimate to a requesting unit (e.g., GPS receiver 912a).

Clock/counter unit 916 is a timer unit that provides the clock needed by various elements within receiver unit 900. Clock/counter unit 916 may further implement a counter or a timer that is operated based on the clock. The timeline for receiver unit 900 is then effectively determined by the counter output.

Memory unit 918 stores various data used by processing unit 914 and/or controller 920. For example, memory unit 918 may store the timing related information (e.g., absolute times for various time instants, computed time offsets, and so on). Memory unit 918 may also store program codes and data for processing unit 914 and/or controller 920.

Controller 920 may direct the operation of processing unit 914. For example, controller 920 may select the particular types of operation to be performed by processing unit 914.

The method and apparatus described herein for implementing a virtual real-time clock and using it for various applications may be implemented by various means, such as in hardware, software, or a combination thereof. For a hardware implementation, the virtual real-time clock may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the virtual real-time clock may be implemented with modules (e.g., procedures, functions, and so on) that perform the functions described herein. The software codes may be stored in a memory unit (e.g., memory 918 in FIG. 9) and executed by a processor (e.g., processing unit 914 or controller 920). The memory unit may be implemented within the processor or external to the processor, in which case it can be communicatively coupled to the processor via various means as is known in the art.

The method and apparatus described herein for implementing a virtual real-time clock may be used in various wireless communication systems and networks. For example, the method and apparatus may be used for CDMA, TDMA, FDMA, and other wireless communication systems. These systems may implement one or more applicable standards. For example, the CDMA systems may implement IS-95, cdma2000, IS-856, W-CDMA, and so on. The TDMA systems may implement GSM and so on. These various standards are known in the art and incorporated herein by reference.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for implementing a virtual real-time clock based on time information from a plurality of communication systems, comprising:

receiving absolute time information from a first communication system;

receiving relative time information from a second communication system;

obtaining internal timing information from a local clock; and providing an estimate of absolute time at a designated time instant based on the absolute time information from the first communication system, the relative time information from the second communication system, and the internal timing information.

2. The method of claim 1, wherein the providing the estimate of absolute time at the designated time instant comprises
providing the estimate of absolute time at the designated time instant based on absolute time at a first time instant determined by the absolute time information, a first time duration determined by the relative time information, and a second time duration determined by the internal timing information.

3. The method of claim 1, wherein the first communication system is the Global Positioning System (GPS) and the absolute time information comprises GPS time for at least one time instant.

4. The method of claim 1, wherein the second communication system is a cellular communication system.

5. The method of claim 4, wherein the relative time information comprises frame-level timing.

6. The method of claim 4, wherein the relative time information is received via a plurality of signaling messages, and wherein time difference between any two signaling messages is ascertainable.

7. A method for implementing a virtual real-time clock based on time information from a plurality of communication systems, comprising:
receiving absolute time information from a first communication system;
receiving relative time information from a second communication system; and
providing an estimate of absolute time at a designated time instant based on the absolute time information from the first communication system and the relative time information from the second communication system, wherein the absolute time information comprises absolute time for a first time instant and the relative time information comprises first and second signaling messages received at second and third time instants, respectively, and wherein the absolute time estimate for the designated time instant is based at least in part on the absolute time for the first time instant and a determined time difference between the second and third time instants.

8. The method of claim 1, further comprising:
calibrating the relative time information from the second communication system based on the absolute time information from the first communication system.

9. A method for providing an estimate of absolute time based on time information from a plurality of communication systems, comprising:
obtaining absolute time from a first communication system for a first time instant;
receiving a first signaling message from a second communication system at a second time instant;
determining a time offset between the first and second time instants;
receiving a second signaling message from the second communication system at a third time instant;
determining an elapsed time between the second and third time instants;
determining a time difference between the third time instant and a fourth time instant; and
providing an estimate of absolute time at the fourth time instant based on the absolute time for the first time instant, the time offset, the elapsed time, and the time difference.

10. The method of claim 9, wherein the time offset and time difference are each determined based on a local clock.

11. The method of claim 9, further comprising:
obtaining absolute time from the first communication system for a fifth time instant; and
determining a difference in absolute time between the first and fifth time instants, and wherein the elapsed time is determined based at least in part on the difference in absolute time.

12. The method of claim 11, further comprising:
determining a frame period for the second communication system based at least in part on the difference in absolute time, and wherein the elapsed time is determined based on the frame period.

13. The method of claim 9, wherein the first and second signaling messages are transmitted at known locations in two frames.

14. The method of claim 9, wherein the first communication system is the Global Positioning System.

15. The method of claim 9, wherein the second communication system is a cellular communication system.

16. The method of claim 15, wherein the relative time information comprises frame-level timing.

17. The method of claim 15, wherein the cellular communication system is operated asynchronously.

18. The method of claim 15, wherein the cellular communication system is a GSM system.

19. The method of claim 18, wherein the first and second signaling messages are synchronization bursts transmitted on a synchronization channel in the GSM system.

20. The method of claim 15, wherein the cellular communication system is a W-CDMA system.

21. A method for providing an estimate of absolute time based on time information from a plurality of communication systems, comprising:
receiving absolute time information from a first communication system;
receiving relative time information from a first transmitter in a second communication system;
receiving relative time information from a second transmitter in the second communication system; and
providing an estimate of absolute time at a designated time instant based on the absolute time information from the first communication system and the relative time information from the first and second transmitters in the second communication system.

22. The method of claim 21, further comprising:
determining a difference between timing of the first and second transmitters, and wherein the absolute time estimate for the designated time instant is further based on the determined difference between the timing of the first and second transmitters.

23. The method of claim 21, wherein the first and second transmitters are asynchronous.

24. A method for providing an estimate of absolute time based on time information from a plurality of communication systems, comprising:
obtaining absolute time from a first communication system for a first time instant;
receiving a first signaling message from a first transmitter in a second communication system at a second time instant;
determining a first time offset between the first and second time instants;
receiving a second signaling message from a second transmitter in the second communication system at a third time instant;

determining a second time offset between the first and third time instants; and providing an estimate of absolute time at a designated time instant based at least in part on the absolute time for the first time instant and the second time offset.

25. The method of claim 24, further comprising:

receiving a third signaling message from the second transmitter at a fourth time instant; and determining a time difference between the fourth and designated time instants, and wherein the absolute time estimate for the designated time instant is further based on the time difference.

26. The method of claim 24, wherein the first and second transmitters are asynchronous.

27. A memory communicatively coupled to a digital signal processing device (DSPD) capable of interpreting digital information to:

receive absolute time information from a first communication system;

receive relative time information from a second communication system;

obtain internal timing information from a local clock; and provide an estimate of absolute time at a designated time instant based on the absolute time information from the first communication system, the relative time information from the second communication system, and the internal timing information.

28. A computer program product for providing an estimate of absolute time based on time information from a plurality of communication systems, comprising:

code for receiving absolute time from a first communication system for a first time instant;

code for receiving relative time information from a second communication system;

code for obtaining internal timing information from a local clock;

code for providing an estimate of absolute time at a designated time instant based on the absolute time for the first time instant, the relative time information from the second communication system, and the internal timing information; and a computer-usable medium for storing the codes.

29. An apparatus for implementing a virtual real-time clock based on time information from a plurality of communication systems, comprising:

means for receiving a representation of a timeline determined by internal timing information from a local clock;

means for receiving absolute time information from a first communication system;

means for associating the absolute time information with the timeline;

means for receiving relative time information from a second communication system;

means for mapping the relative time information to the timeline; and means for providing an estimate of absolute time at a designated time instant on the timeline based on the associated absolute time information, the mapped relative time information, and the internal timing information.

30. The apparatus of claim 29, wherein the timeline representation is provided by a counter.

31. A receiver unit in a wireless communication system, comprising:

a first receiver operative to process signals from a first communication system to provide absolute time information;

a second receiver operative to process signals from a second communication system to provide relative time information; and a processing unit operative to provide an estimate of absolute time at a designated time instant based on the absolute time information from the first communication system, the relative time information from the second communication system, and internal timing information from a local clock.

32. The receiver unit of claim 31, further comprising:

a timer unit operative to provide a representation of a timeline to which the absolute time information and relative time information are mapped.

33. The receiver unit of claim 31, wherein the first receiver is operative to process signals from GPS satellites.

34. The receiver unit of claim 31, wherein the second receiver is operative to process signals from one or more base stations in a cellular communication system.

35. The receiver unit of claim 31, wherein the processing unit is operative to receive an absolute time for a first time instant from the first receiver and to determine a time offset between the first time instant and timing of each of at least one base station received by the second receiver.

36. A receiver apparatus in a wireless communication system, comprising:

means for processing signals from a first communication system to provide absolute time information;

means for processing signals from a second communication system to provide relative time information;

means for obtaining internal timing information from a local clock; and means for providing an estimate of absolute time at a designated time instant based on the absolute time information from the first communication system, the relative time information from the second communication system, and the internal timing information.

37. An apparatus comprising:

a counter operative to maintain internal timing based on a local clock; and a processing unit operative to determine absolute time for a first time instant based on timing of a first communication system, to determine a first time duration based on timing of a second communication system, to determine a second time duration based on the internal timing maintained by the counter, and to determine an estimate of absolute time for a second time instant based on the absolute time for the first time instant, the first time duration, and the second time duration.

38. The apparatus of claim 37, wherein the processing unit is further operative to calibrate the timing of the second communication system based on the timing of the first communication system.

* * * * *